Patented June 11, 1946

2,402,113

UNITED STATES PATENT OFFICE 2,402,113

STABILIZATION OF BUTADIENE

Lewis F. Hatch, Austin, Tex., and David E. Adelson and Billee O. Blackburn, Berkeley, Calif., assignors to Shell Development Company, San Francisco, Calif., a corporation of Delaware No Drawing. Application October 13, 1941, Serial No. 414,782

2 Claims. (Cl. 260—666.5)

This invention relates to the art of stabilization of butadiene, and to the improved compositions thereby obtained. Also, the invention is directed to the use of the stabilized butadiene in emulsion co-polymerization reactions.

When butadiene is exposed to the action of air and/or light, a gradual polymerization takes place with the formation of resinous products. Also, it has been found that the storage of butadiene in ferruginous containers, such as iron drums, promotes corrosion of the containers, the rust thus formed, in turn, promoting the polymerization of the butadiene. Although plastic materials, such as synthetic rubber, are produced by the polymerization of butadiene, it is frequently desirable, if not essential, that the butadiene be stabilized against such polymerization so that it can be stored for relatively long periods of time following its preparation. This is due to the fact that butadiene finds many uses, such as in the manufacture of chloroprene or of products of emulsion polymerization of the butadiene with other co-polymerizable compounds of the type of styrene, vinyl type cyanides, such as acrylic or methacrylic acid nitriles, and the like, in which case it is desirable to maintain the butadiene in the monomeric state at least until its utilization for such purposes.

It is therefore among the objects of the invention to provide a process for inhibiting polymerization of butadiene. A further object of the invention is to provide a relatively stable monomeric butadiene. Another object of the invention is to inhibit corrosion or rusting of ferruginous containers in which butadiene is stored. A still further object of the invention is to employ the butadiene stabilized according to the present process, as one of the reactants in emulsion co-polymerization reactions.

As stated above, butadene-1,3 is frequently used as one of the reactants for the preparation of resinous and/or plastic materials by the polymerization thereof with other co-polymerizable compounds. Heretofore, when various readily polymerizable materials, such as vinylidene chloride, and the like, which have been stabilized against undesirable polymerization by the addition of different stabilizing agents thereto, were to be used as one of the reactants in co-polymerization processes, it was necessary to subject such stabilized compounds to a preliminary treatment, such as a distillation, to remove the stabilizing agent prior to the use of the material in the aforementioned co-polymerization reaction. Such additional treatment of the polymerizable monomeric compounds naturally increased the cost of the final products obtained. It is, therefore, a still further object of the invention to provide stabilizing agents which, when added in certain relatively small amounts, will not affect substantially the co-polymerization of the butadiene-1,3 with other readily polymerizable compounds, but will nevertheless inhibit the undesirable polymerization of the thus stabilized butadiene when it is subjected to normal or ordinary storage and/or transportation conditions. In other words, the present invention obviates the necessity of pre-treating the stabilized butadiene to remove the stabilizing agent or agents therefrom prior to the co-polymerization reaction. In some cases, however, as this will be discussed more fully hereinbelow, it may be found advisable or economical to subject the butadiene stabilized according to one phase of the present invention, to a simple pre-treatment prior to its use as one of the reactants in the aforementioned co-polymerization reactions. One of the most specific objects of the invention is the provision of stabilizing agents which, when added in suitable amounts, will inhibit the undesirable polymerization of the butadiene under storing and/or transporting conditions, but which will have substantially no, or only a very slight effect on the catalytic emulsion co-polymerization of such stabilized butadiene with other readily polymerizable compounds, such as styrene, acrylic and/or methacrylic acid nitriles, and the like.

It has now been discovered that the above and other objects may be attained by incorporating certain organic compounds. More specifically, it has been discovered that certain dihydric phenols, when added to butadiene-1,3, will stabilize it against polymerization, and will prevent corrosion or rusting of ferruginous containers employed for the storage and/or transportation of the butadiene thus stabilized. Generically stated, the organic compounds which are suitable as stabilizing agents for the butadiene consist of the ortho-dihydroxy mono-nuclear aromatic compounds, and more particularly comprise ortho-dihydroxy-benzene and alkylated derivatives thereof having one or more alkyl radicals attached to the carbon or carbon atoms of the benzene nucleus. In other words, the class of compounds which may be used as butadiene stabilizing agents according to the present invention, have the general formula

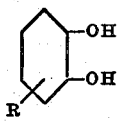

wherein R may be either a hydrogen atom or one or more alkyl radicals attached directly to one or more of the carbon atoms of the ring. Of the alkylated catechols suitable as stabilizing agents, those containing an alkyl group in the 4-position were found to be particularly suitable. Therefore, besides catechol, which has been found to be a very suitable stabilizing agent, although it is possible to use substituted catechols having an alkyl radical, e. g. a methyl, ethyl, propyl, n-butyl, tertiary butyl or amyl radical, or several such alkyl radicals, attached to any one or more of the carbon atoms of the benzene ring (in lieu of the hydrogen atoms attached thereto), highly satisfactory results have been obtained by the incorporation into the butadiene of catechols having an alkyl radical, and preferably one having not more than five carbon atoms, attached to the ring in the 4-position. Examples of such alkylated catechols are 4-methyl catechol, 4-ethyl catechol, 4-propyl catechol, 4-tertiary-butyl catechol, and the like. As will be seen from the examples, exceptionally good results were obtained when butadiene-1,3 was stabilized by the addition thereto of even very small amounts of catechol or 4-tertiary-butyl catechol.

The proportion in which the above stabilizing agents may be incorporated with the butadiene is dependent, in part, upon the length of time for which it is desired to stabilize the butadiene, the composition and condition of the container employed for its storage and/or transportation, and the particular agent or agents employed. While any desired proportions of the stabilizing agent or mixtures thereof may be employed, the use of up to about five percent by weight thereof in the stabilized composition is generally sufficient. It must be noted, however, that the relatively low solubility of many of the above-outlined catechols in the butadiene generally limits the concentration of the catechols to considerably below one percent by weight of the stabilized product. Also, as will be shown in the examples, very low concentrations, i .e. in the order of 0.01% to 0.03%, or even less, is generally sufficient to inhibit polymerization of the butadiene and the corrosion or rusting of the ferruginous containers used for its storage and/or transportation. These relatively low concentrations of the stabilizing agent do not have any substantial effect on emulsion co-polymerization reactions, so that the thus stabilized butadiene may be used in such reactions without it being necessary to subject it to any preliminary treatment which would remove the stabilizing agent therefrom. On the other hand, the use of the stabilizing agent in greater concentrations, such as 0.1% or more by weight of the butadiene, may require the use of excessive amounts of catalyst during the emulsion co-polymerization of such stabilized butadiene with other co-polymerizable compounds. In fact, the use of the above defined stabilizing agents in relatively high concentrations may necessitate a pre-treatment of the stabilized butadiene prior to such co-polymerization reactions, the presence of a large quantity of the stabilizing agent completely preventing the co-polymerization reactions even when large quantities of the reaction promoting catalyst are used.

The following detailed examples are given for the purpose of illustrating the present invention and the advantages derived from stabilizing butadiene-1,3 with the above-defined dihydric phenols. It is understood that the agents mentioned in these examples are given by way of illustration only and that other dihydric phenols of the group defined hereinabove may be employed with the same or like success. Also, the invention is not to be considered as limited to the specific conditions, such as the concentrations of the stabilizing agent, the conditions and concentrations employed for the emulsion co-polymerization, etc., disclosed in the examples.

Example I

Catechol was added to liquefied butadiene-1,3 in such an amount that its concentration in the stabilized product was equal to about 0.1% by weight. This liquid product was then introduced into an evacuated steel bomb. After thus filling the bomb, the inlet valve was closed, and the filled bomb was stored for a period of about 13½ months. At the end of this period of time, the butadiene was withdrawn from the container. This butadiene was found to possess only a slight amber yellow color. The butadiene was substantially free from any non-volatile materials, i. e., products of butadiene polymerization. Upon sawing off the ends of the storage bomb, and upon examining the inner walls of the container, it was found that they were substantially free from rust and had no crystalline inhibitor deposited thereon.

For purposes of comparison, butadiene which was not stabilized by the addition of any agent or agents, was introduced into a similar steel bomb, and was stored for the same period of time as the one containing the stabilized butadiene. Upon withdrawal of the butadiene at the end of the 13½ month period, it was found that the butadiene contained a rusty sediment. Also, the inner walls of the bomb were highly corroded. Since the greatly increased surface presented by the rust affords an opportunity for the formation of polymerization centers, the presence of such rust in containers for butadiene storage is highly undesirable.

An analysis of the above tests shows that the presence of even small amounts of the mentioned dihydroxy benzene in the butadiene prevents the corrosion of the walls of ferruginous containers employed for its storage. This, in turn, retards or even completely prevents any undesirable polymerization of the stored butadiene.

Example II

Since it is known that the presence of peroxides promotes the polymerization of unsaturated hydrocarbons, several tests were run to determine the inhibiting effect of catechol and alkylated catechols on the peroxide formation in butadiene. In each case, the treated material contained five percent butadiene and ninety-five percent toluene. The ortho-dihydroxy mono-nuclear aromatic compound was added in such an amount that its concentration was about 0.02% by weight based on the butadiene present in the solution. Each of the samples was subjected to an accelerated oxidation test. For this purpose a 150 cc. sample of the material disposed in a glass tube was placed in a stainless steel autoclave. The space above the sample contained air under a pressure of one atmosphere. After closing, the autoclave was heated to a temperature of about 100° C. The peroxides were determined by the Yule and Wilson method. The following table shows the results obtained:

| Stabilizing agent used | Initial | Peroxide number after 2½ hrs. | After 5 hrs. |
|---|---|---|---|
| None | 0.49 | 3.22 | 3.16 |
| Catechol | 0.42 | 0.73 | 0.82 |
| 4-tert.-butyl catechol | 0.45 | 0.69 | 0.69 |

The peroxide numbers given in the above table refer to milli-equivalents of active oxygen per liter of the solution.

Example III

A butadiene-toluene solution containing five percent butadiene was subjected to accelerated oxidation tests according to the process described above. One sample contained 4-tertiary-butyl catechol in an amount equal to 0.02% by weight of the butadiene, while no stabilizing agent was added to another sample. The results obtained are as follows:

| Stabilizing agent used | Initial | Peroxide number after 2½ hrs. | After 5 hrs. |
|---|---|---|---|
| None | 0.15 | 1.58 | 3.18 |
| 4-tert.-butyl catechol | 0.14 | 0.15 | 0.16 |

A comparison of the results obtained in the tests described in Examples II and III shows that the presence of even small percentages of catechol or 4-tertiary-butyl catechol inhibit peroxide formation in butadiene. The low peroxide content of butadiene thus stabilized inhibits any undesirable polymerization of butadiene subject to storage and/or transportation.

For the purpose of determining the effect of the presence of the defined dihydric phenols on the co-polymerization of butadiene with other co-polymerizable compounds, a series of emulsion co-polymerizations of butadiene and acrylonitrile were effected both in the presence and in the absence of the defined butadiene stabilizing agents.

Example IV

The charge had the following composition:

| | Per cent |
|---|---|
| Butadiene | 21.5 |
| Acrylonitrile | 7.1 |
| Water | 69.9 |
| Soap flakes | 1.4 |
| Ammonium persulfate | 0.11 |

The soap was employed as the dispersing agent, while the ammonium persulfate acted as the reaction-promoting catalyst. The molar ratio of the butadiene to the acrylonitrile was three to one.

The polymerization reaction was continued for a period of about 56 hours, the reactants being maintained in a Pyrex glass bomb at a temperature of about 40° C. At the end of the run, the sample was transferred to a glass beaker. A sodium chloride solution was then added, and the material thus precipitated was filtered and washed. The yield of the product of co-polymerization was 93.0% by weight.

Example V

A mixture having the same composition as that used in Example IV, with the exception that it contained about 0.4% of the ammonium persulfate and 4-tertiary-butyl catechol in a concentration of about 0.01% by weight of the butadiene, was subjected to a co-polymerization and treatment according to the method described in said example. The yield of the co-polymer was 85.2% by weight.

Example VI

The sample treated had the same composition as that used in Example V, except that the concentration of the 4-tert.-butyl catechol was 0.03% by weight of the butadiene. The yield of the co-polymer was 84.4% by weight.

An analysis of the last three examples shows that the presence of the defined agents, although stabilizing the butadiene against undesirable polymerization, does not affect to any substantial degree its co-polymerization with acrylonitrile, and that the yield of products of emulsion co-polymerization may be raised to that obtained in blank samples (i. e. those which do not contain any inhibitor) provided the quantity of the catalyst is increased slightly.

It is to be noted that the presence of relatively large concentrations of catechol or of an alkylated catechol will inhibit or even prevent its normal emulsion co-polymerization with acrylonitrile or the like. For example, no products of emulsion co-polymerization were obtained when catechol was present in a concentration of about 0.1% by weight of the butadiene used. However, it was found that this defect may be readily remedied by a simple washing of the stabilized butadiene with caustic, e. g. sodium hydroxide solution, followed by a washing with water. The thus treated butadiene, when subjected to an emulsion co-polymerization with acrylonitrile under conditions and according to the process described in Example IV, gave a 84.7% yield of products of the co-polymerization.

Although the present invention has been described with particular reference to the stabilization of butadiene with catechol or 4-tertiary-butyl catechol, and the emulsion co-polymerization of acrylonitrile with butadiene stabilized with 4-tert.-butyl catechol, it is to be understood that other agents of the described group may also be used, and that these stabilizers, when employed in sufficiently low concentrations, will effect the stabilization of the butadiene against undesirable polymerization under storage and/or transportation conditions, but will not interfere to any substantial degree with the copolymerization of the thus stabilized butadiene with other co-polymerizable compounds.

We claim as our invention:

1. Monomeric butadiene stabilized with between about 0.01% and about 0.03% by weight of 4-tertiary-butyl catechol.

2. A process for stabilizing monomeric butadiene disposed in ferruginous containers which comprises dissolving 4-tertiary butyl catechol in the butadiene in an amount of between about 0.01% and about 0.03% by weight of the butadiene.

LEWIS F. HATCH.
DAVID E. ADELSON.
BILLEE O. BLACKBURN.